United States Patent
Walley et al.

(10) Patent No.: US 9,521,268 B2
(45) Date of Patent: Dec. 13, 2016

(54) APPLICATION LAYER INTEGRATION INTO A MULTI-RAT ACCESS AND HANDOVER ENVIRONMENT

(71) Applicant: Broadcom Corporation, Irvine, CA (US)

(72) Inventors: John Walley, Ladera Ranch, CA (US); Raymond Hayes, Los Gatos, CA (US); Wael Diab, San Francisco, CA (US); Murat Mese, Rancho Palos Verdes, CA (US); Kamlesh Rath, San Ramon, CA (US); Shao-Cheng Wang, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/295,011

(22) Filed: Jun. 3, 2014

(65) Prior Publication Data
US 2014/0357224 A1 Dec. 4, 2014

Related U.S. Application Data

(60) Provisional application No. 61/892,329, filed on Oct. 17, 2013, provisional application No. 61/830,567, filed on Jun. 3, 2013.

(51) Int. Cl.
*H04W 36/00* (2009.01)
*H04W 72/00* (2009.01)
*H04B 1/38* (2015.01)
*H04M 15/00* (2006.01)
*H04W 36/26* (2009.01)
*H04W 52/02* (2009.01)

(52) U.S. Cl.
CPC ......... *H04M 15/8038* (2013.01); *H04W 36/26* (2013.01); *H04M 15/8016* (2013.01); *H04W 36/0072* (2013.01); *H04W 52/0261* (2013.01)

(58) Field of Classification Search
CPC ................................. H04W 52/0261–52/0296
USPC .... 455/432.1–454, 550.1, 552.1, 553.1, 566; 370/310.2, 328, 331–333, 338
See application file for complete search history.

(56) References Cited

U.S. PATENT DOCUMENTS

| 8,995,278 B1* | 3/2015 | Vivanco | H04W 36/26 370/237 |
| 2006/0025149 A1* | 2/2006 | Karaoguz | H04N 21/4126 455/452.2 |

(Continued)

*Primary Examiner* — San Htun
(74) *Attorney, Agent, or Firm* — Sterne, Kessler, Goldstein & Fox PLLC

(57) ABSTRACT

A wireless communication device communicating with a serving base station in a wireless communication environment may have one or more applications running. When seeking to handover from the serving base station to a target base station, the wireless communication device adjusts the configurations of the applications based on the new communication link properties. Likewise, when an application is loaded that prefers communication link properties that exceeds a current communication link's capabilities, the wireless communication device may seek out and hand over to other communication links. By cooperatively coordinating the functionality of installed applications with communication link properties, the wireless communication device can maintain high levels of device and application functionality.

18 Claims, 6 Drawing Sheets

(56) References Cited

U.S. PATENT DOCUMENTS

| | | | | |
|---|---|---|---|---|
| 2006/0166677 A1* | 7/2006 | Derakshan | ............ | H04W 36/14 |
| | | | | 455/453 |
| 2008/0242301 A1* | 10/2008 | Osterling | .............. | H04W 36/08 |
| | | | | 455/436 |
| 2010/0099393 A1* | 4/2010 | Brisebois | .............. | H04M 15/28 |
| | | | | 455/418 |
| 2010/0150102 A1* | 6/2010 | Li | ......................... | H04W 36/24 |
| | | | | 370/331 |
| 2010/0273486 A1* | 10/2010 | Kharia | .............. | H04W 52/0261 |
| | | | | 455/436 |

* cited by examiner

APPLICATION LAYER INTEGRATION INTO A MULTI-RAT ACCESS AND HANDOVER ENVIRONMENT

CROSS-REFERENCE TO RELATED APPLICATIONS

This application claims the benefit of U.S. Provisional Application No. 61/892,329, filed Oct. 17, 2013, and U.S. Provisional Application No. 61/830,567, filed Jun. 3, 2013, which are incorporated by reference in their entirety.

BACKGROUND

1. Field

The disclosure relates to wireless communication, and specifically to integrating wireless connection properties into application functionality.

2. Related Art

As wireless communication devices move throughout a wireless communication environment, their connectivity properties, such as signal strength, signal-to-noise ratio, and channel characteristics change. As connectivity degrades, the wireless communication device and/or a current base station to which the wireless communication device is connected may decide to initiate a handover from the current base station to a nearby base station that can provide better connectivity.

Conventionally, such a handover is made without consideration of applications running on the device. The wireless communication device may also select and/or hand over between radio access technologies (RATs) in a similar manner. Regardless of whether the wireless communication device changes serving base stations and/or RATs, conventional device applications function substantially the same and are generally unaware of the changed connection characteristics.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
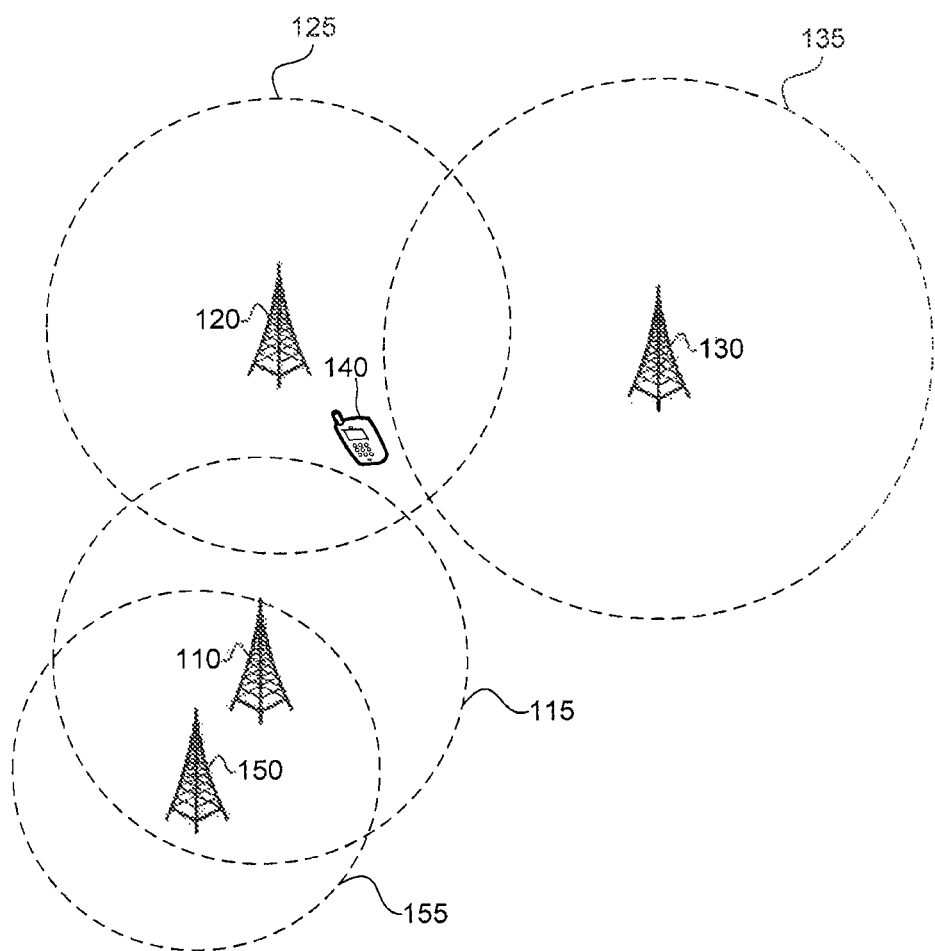
FIG. 1 illustrates an exemplary wireless communication environment according to an exemplary embodiment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, processor, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various wireless systems, and should not be limited to small/femto cells.

An Exemplary Wireless Environment

FIG. 1 illustrates an exemplary wireless communication environment 100 according to an exemplary embodiment. The wireless communication environment includes one or more full base stations (120/130) and one or more small/femto base stations (110/150) (hereinafter commonly referred to as "small" cell). In an embodiment, the base stations can be access points for WLAN or other short-range wireless communication standards. Each base station provides wireless connectivity to a corresponding service cell or area. For example, full base station 120 provides a service cell 125, full base station 130 provides a service cell 135, and small base stations 110 and 150 provide service cells 115 and 155, respectively.

A subscriber device 140 within the environment 100 wirelessly connects to the network by communicating with a serving cell. For example, as shown in FIG. 1, because of the location of the subscriber device 140, it will be connected to the network via the full base station 120. However, as the subscriber device moves south, it may perform a handover in order to switch from the full base station 120 to the small cell 115. As the device 140 moves even further south, another handover may occur from the small cell 110 to the small cell 150. In this manner, the device 140 can maintain connectivity while moving in and out of various cellular coverage areas.

The base stations in the environment assist in determining whether the device 140 should perform the handover by measuring nearby cells. In order to perform this measuring, the serving cell must "sniff" those neighboring cells. In other words, the serving cell acquires wireless signals from the neighboring cells. After enough data has been acquired, an analysis takes place. From the analysis, the serving cell can assist the device 140 in determining whether to initiate a handover to the neighboring cell. Accordingly, sniffing can include scanning to receive known frequencies of various RATs and determining corresponding signal amplitudes and other signal characteristics that can be used to determine base-station or RAT availability. Sniffing is important for calculating and refining other parameters as well, including timing, neighbor cell list, parameters required for unique self-configuration, interference measurement, limiting the transmission power, etc. In conventional macro cells, sniffing is not supported, and service to and/or from subscriber devices must be completely interrupted for the full duration necessary to acquire the needed information. Therefore, an exemplary node is provided herein for performing sniffing, while minimizing service interruptions.

Exemplary Wireless Communication Device

Figure 2:
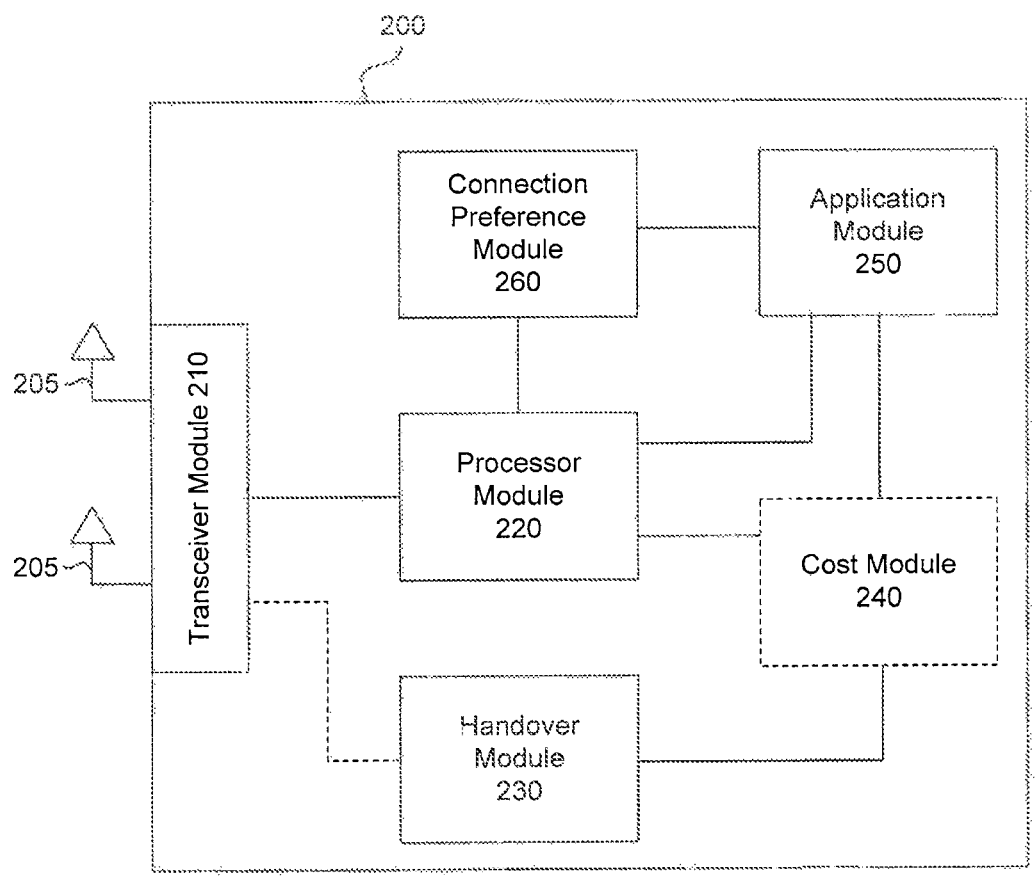
FIG. 2 illustrates a block diagram of an exemplary wireless communication device.

FIG. 2 illustrates a block diagram of an exemplary wireless communication device 200 according to an embodiment of the disclosure. The wireless communication device 200 includes one or more antennas 205, a transceiver module 210, a processor module 220, a handover module 230, an optional cost module 240, an application module 250, and a connection preference module 260, and may represent an exemplary embodiment of the subscriber device 140.

The transceiver module 210 performs front-end transceiver processing so as to transmit wireless signals to, and receive wireless signals from, the wireless communication environment 100 via the one or more antennas 205. Such front-end processing may include modulation/demodulation, amplification, filtering, and encoding among other processings.

The transceiver module 210 is in communication with the processor module 220, which performs general processing of incoming and outgoing signals, as well as general device control of the wireless communication device 200.

The processor module 220 is connected to the handover module 230. In some embodiments, the handover module 230 may assist in determining whether to perform a handover. In addition, once the decision has been made to perform a handover, the base station may notify the wireless communication device 200. The processor module 220 forwards the handover decision to the handover module 230, which controls the transceiver module 210 to perform the handover. Such control may involve retuning the local oscillator of the transceiver module, adjusting its modulation and encoding schemes, among others.

Application/Handover Integration

Today's wireless communication devices have significant capabilities, from streaming video to interactive control. However, applications for use with these devices have a wide range of quality of service (QoS) requirements. For example, a streaming video application may require significant bandwidth and QoS to properly function. In the same wireless communication device, a separate application may provide primarily text viewing to its user, and therefore may require much less bandwidth and QoS. As a handover takes place from one serving base station to another, the communication characteristics change, which can have a significant effect on application performance. By notifying the applications of the handover characteristics, the applications can modify their functionality so as to enhance their performance in the changed communication settings. In an embodiment, the handovers can take place with respect to certain data types, rather than all communications.

In order to apprise the applications of the change, in addition to initiating the handover in the wireless communication device 200, the handover module 230 also notifies the application module 250 of the handover. In an embodiment, this notification can include expected signal quality, signal strength, bandwidth, and/or QoS parameters on the new serving base station. Using this information, the application module 250 can adjust the performance of the applications accordingly.

Application Module

Figure 3:
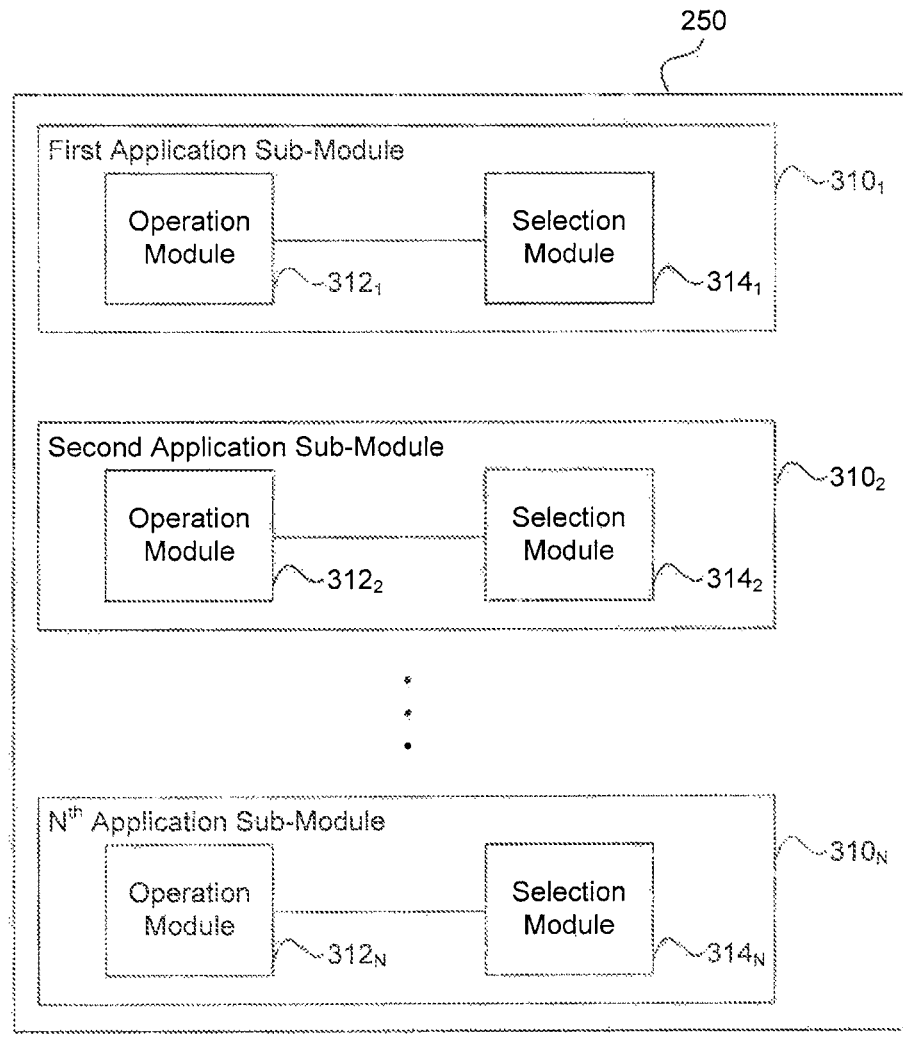
FIG. 3 illustrates a block diagram of an exemplary application module.

FIG. 3 illustrates a block diagram of an exemplary application module 250 according to an embodiment of the disclosure. The application module 250 includes a plurality of application sub-modules 310, at least one for each running application on the device 200. Each application sub-module includes an operation module 312 and a selection module 314.

When the application module 250 is notified of a handover, and provided the relevant new communication link information, the application module 250 provides the handover information to each of the application sub-modules 310. The operation of the application sub-modules 310 will now be described with respect to the first application sub-module 310.

The operation module $312_1$ controls the general functionality of the first application, such as a current operating state of the first application. Upon being notified of the changing communication link and parameters, the selection module $314_1$ selects a new operating state of the first application. For example, in an embodiment, the selection module $314_1$ performs analysis and/or calculations on the received handover information. Such analysis may include comparing the various received communication parameters to corresponding thresholds or performing a calculation on the aggregate of the received parameters. Using the result of the analysis, the selection module $314_1$ selects a new operating state of the first application.

To provide an example, when a handover is initiated, the first application sub-module $310_1$ receives a bandwidth and signal strength of the new base station. Using these parameters, the selection module $314_1$ calculates that the first application (e.g., a video streaming application) would need to reduce video quality from 1080p to 480p in order to maintain seamless video viewing. Therefore, the selection module $314_1$ selects an operating state of the first application to only stream video in 480p. This is a simplified example that is only concerned with a single operating characteristic (i.e., video quality) and only two connection parameters (i.e., bandwidth and signal strength). Other examples may balance the effect of several new parameters on several operating characteristics.

In another embodiment, the selection module $314_1$ may include a list or table of operating states in correspondence with the values of one or more connection parameters. To give another simplified example, an operation state table within the selection module $314_1$ may include three operating states corresponding to various QoS's. The first operating state may be designated for a QoS<x, the second operating state may be designated for x≤QoS≤y, and the third operating state may be designated for QoS>y. In this manner, using the received QoS parameter of the handover, the selection module $314_1$ can quickly and efficiently determine an operating state of the first application.

After the selection module $314_1$ selects the operating state of the first application, the selection module $314_1$ reconfigures the operation module $312_1$ to implement the selected operating state. In this manner, the running application can adjust its performance to maintain smooth operation and a smooth user experience regardless of the link characteristics.

In a similar manner as that described above, the wireless communication device 200 can also configure the operating states of newly-initiated applications. For example, in an embodiment, upon the startup of an application, that applications sub-module can be added to the application module 250. The selection module 314 can then retrieve the current communication link parameters from either the processor module 220 or the handover module 230 and use the retrieved parameters to configure the operation state of the application. In another embodiment, the application sub-modules can be maintained for all installed applications. Upon initiating a handover, the operating states of all installed applications are selected. Once an application is initiated, it simply starts up with its selected operating state.

In yet another embodiment, application sub-modules are maintained for all running applications, as well as various installed applications according to a priority list. The priority list may rank installed applications according to one or more parameters, such as usage frequency, for example. Application sub-modules are then maintained in the application module 250 for the installed applications with a priority above a predetermined threshold. In this manner, frequently used applications have their operating states selected even before they are initiated, whereas less frequently-used applications must determine their operating state upon startup. This helps to balance the processing required of a handover operation, while increasing start-up efficiency of the installed applications. In still another embodiment, starting up an application will cause the application to operate in a default operating state until a handover is initiated, at which time the application can adjust its operating state according to the handover properties.

Application Connection Preferences

As discussed above, different applications may have different preferred connection settings in order to operate optimally. However, when the wireless communication device is currently connected to a serving base station, it will conventionally not sniff out alternative base stations and/or RATs until the connection with the current base station degrades below a predetermined threshold. Therefore, applications that prefer superior connection characteristics to those of the currently-serving base station will conventionally have to wait for the current wireless connection to sufficiently degrade before it can hope for a better connection.

As shown in FIG. 2, the wireless communication device 200 can include a connection preferences module 260. When an application is installed on the wireless communication device, the application may register certain connection preferences with the connection preferences module 260. Such preferences may include a preferred RAT, access point (AP), QoS, and/or signal-to-noise ratio (SNR), among others.

In practice, when an application is loaded, the processor module 220 becomes aware of the newly-loaded application and accesses the connection preferences module 260 to determine whether the application has registered any connection preferences. Upon determining that the application has registered connection preferences, the processor module will compare the connection preferences to current connection parameters to determine whether the current connection satisfies (e.g., meets or exceeds) the application preferences. If the processor module 220 determines that the application's connection preferences are not met, the processor module 220 controls the transceiver module 210 to perform a sniffing operation of nearby access points. The sniffing operation will reveal nearby access points and their connection capabilities. If a nearby access point is found that can satisfy the application's connection preferences, the processor module 220 notifies the handover module 230, which controls the transceiver module to initiate a handover to the nearby access point.

In this manner, while conventional devices would wait for a degradation in general signal quality before performing a sniffing operation, the wireless communication device 200 performs the sniffing operation early in order to quickly satisfy the preferences of the newly-loaded application, In an embodiment, when there are no nearby access points that satisfy the preferred connection capabilities of the application, the wireless communication device will periodically perform the sniffing operation for the duration of the application's operation until a suitable access point is found that satisfies the preferred connection capabilities. In an embodiment, the applications are ranked according to priority, and sniffing is only performed for newly-loaded applications when their priority exceeds the priorities of currently-running applications.

Cost Consideration

Changes to communication quality, as caused by handovers and/or application preferences, often have a certain cost associated therewith. The cost can be based on data plan costs and the expected data transmission/reception rate of the new communication link, as well as power costs, and others. In many circumstances, a device user may wish to accept or reject these costs based on their level of desire to use certain application functionalities. Therefore, the wireless communication device 200 provides control to the user for selecting whether to accept or reject a proposed communication link change based on the estimated cost.

For example, in an embodiment, the wireless communication device 200 may include a cost module 240. When the processor module 220 determines that a handover should be initiated for any of the reasons described above, the processor module 220 notifies the cost module 240. This notification preferably includes the expected connection properties of the post-handover communication link. The cost module 240 uses the expected connection properties to calculate an expected cost associated with the new communication link, and provides the user's acceptance or denial of the handover.

Figure 4:
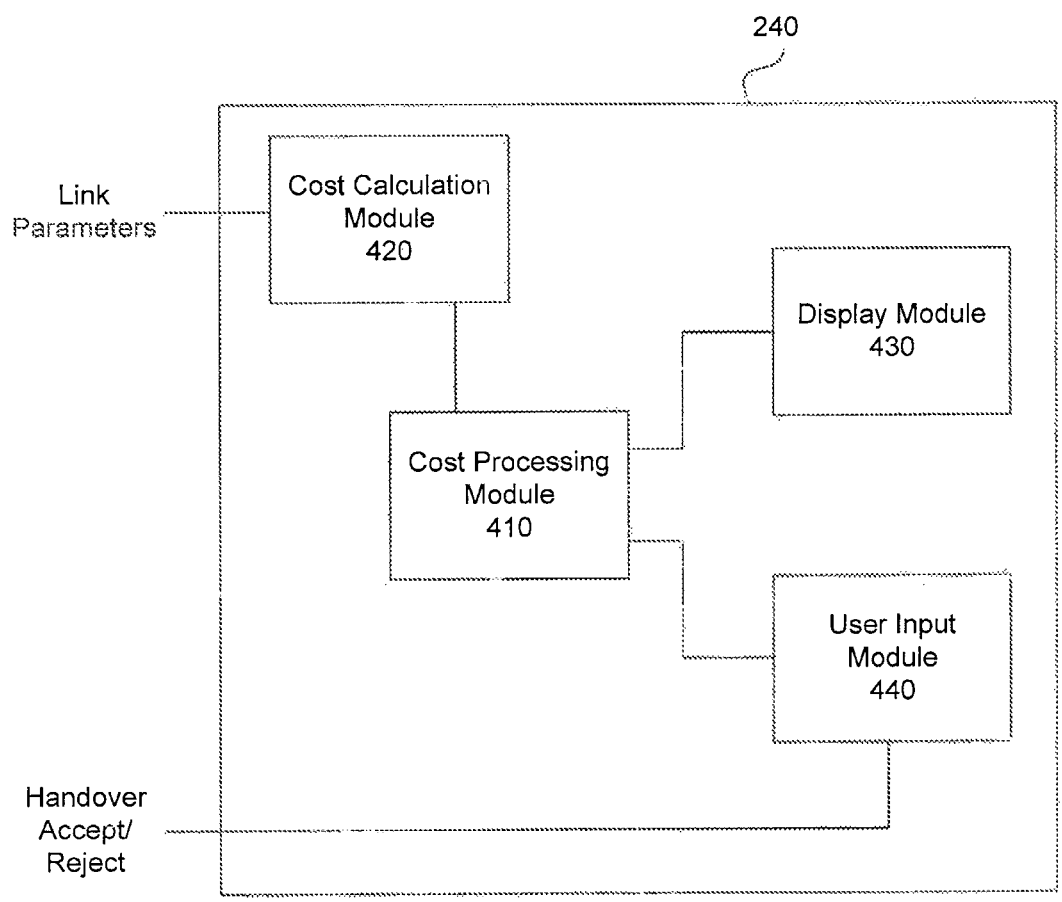
FIG. 4 illustrates a block diagram of the exemplary cost module.

FIG. 4 illustrates a block diagram of the exemplary cost module 240. The cost module 240 includes 4 cost processing module 410, a cost calculation module 420, a display module 430, and a user input module 440.

The cost calculation module 420 receives the link parameters from the processing module 220 and calculates the cost associated with the new communication link. As discussed above, this calculation may be based on the expected data rate, a data cost associated with the user's data plan subscription, a power cost, as well as other factors, which the cost calculation module 420 can retrieve from device memory (not shown).

After calculating the cost of the proposed communication link, the cost calculation module 420 forwards the cost information to the cost processing module 410. The cost processing module 410 controls the display module 430 to display the cost information to a user of the device. In an embodiment, the cost information is displayed in such a way so as to direct the user to input a first input to accept the cost and input a second input to decline the cost.

Once the information has been displayed, the cost processing module 410 controls the user input module 440 to receive a user input from the user in response to the displayed cost information. After receiving the user input indicating whether the cost is accepted or declined, the user input module 440 forwards the user's decision back to the processing module 220, which then either instructs the handover module 230 to initiate the handover (when the response indicates the user's acceptance), or cancels further handover processing (when the response indicates the user's rejection). In this manner, otherwise costly handovers can be manually managed by a user based on their willingness to bear the cost associated with the new connection.

Adaptive Loading

As discussed above, there are several factors within the exemplary wireless communication device 200 that may cause or prevent a handover. In an embodiment, the decisions of whether to handover or not can also be influenced by a load on the various communication links. In other words, the processor module 220 can factor in link loading when determining whether to initiate and/or cancel a handover.

In an embodiment, the current serving base station, as well as nearby base stations, transmit link load information to the wireless communication device 200, which the transceiver module 210 receives. The transceiver module 210 forwards the link load information to the processor module 220, which may immediately analyze the information and/or store in memory (not shown) for later reference.

In an embodiment, upon receiving link load information from the current serving base station, the processor module 220 processes the link load information in order to determine whether a current communication link is under a high load condition. This determination may involve comparing a current load of the communication link to a predetermined threshold, for example.

If the analysis of the link load information indicates that the current communication link is in a normal or low-load condition, then the wireless communication device 200 continues to employ the previously-described methods for determining whether to initiate a handover. On the other hand, if the analysis indicates that the current communication link is in a high-load condition, then the processor module 220 takes action to determine whether a handover to a less-loaded communication link can occur. This action may involve analyzing the application preferences, the available links, and/or the costs of the handover in order to determine whether a handover is viable, For example, the determination to handover may depend on whether the degree of the capabilities of the available communication links to fully or partially serve the preferences of running or installed applications, the costs associated with handing over, as well as other factors. Further, these factors can be balanced against the detriments of remaining on the current high-load communication link.

In a similar scenario, once the wireless communication device 200 determines that a handover should be initiated, such as for any of the reasons discuss above, the processor module 220 can allow the handover to proceed or prevent the handover based on the link load of the target communication link. For example, even when application preferences or current link quality dictate a handover to be made, the processor module 220 may deny the handover when the target communication link is in a high-load state.

In an embodiment, even when such a handover is denied based on the link load of the target communication link, the processor module 220 may still initiate a handover to an alternative communication link that is less preferred than the target communication link, but that does not have the high load issues that are present at the target communication link. In another embodiment, the processor module 220 may cause the transceiver module 210 to periodically request or otherwise obtain the load information of the target communication link. This will allow the wireless communication device 200 to quickly determine when the target communication link becomes available, and to make an effective handover to the target communication link at that time.

Exemplary Method for Performing Handovers

Figure 5:
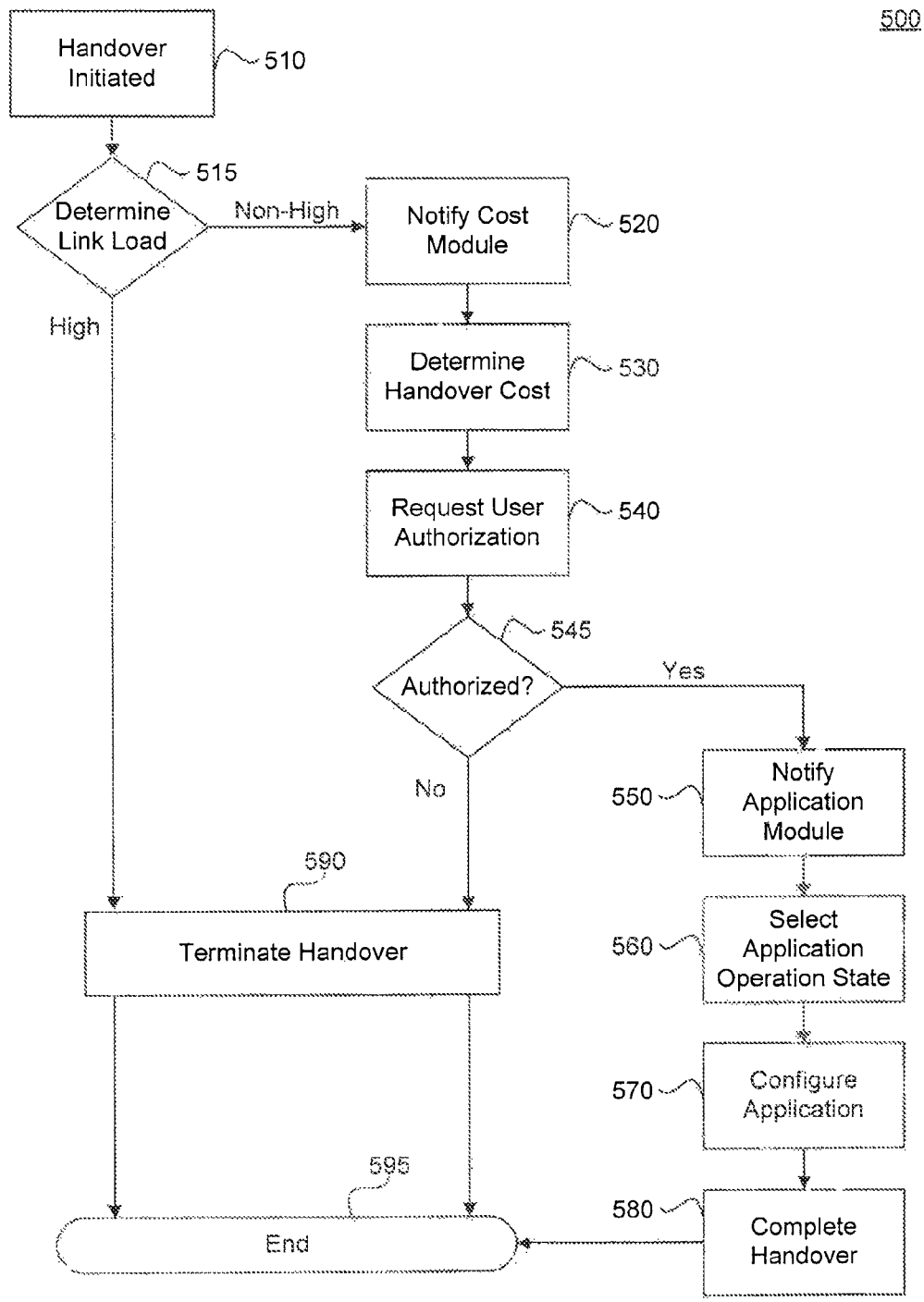
FIG. 5 illustrates a flowchart diagram of an exemplary method for performing handovers within the wireless communication device.

FIG. 5 illustrates a flowchart diagram of an exemplary method 500 for performing handovers within the wireless communication device 200. For purposes of illustration, the method of FIG. 5 will be discussed with continued reference to FIG. 2.

In step 510, a handover is initiated. The handover may be initiated in any of the several ways described in this specification. Once the handover has been initiated, in step 515, a determination of the target link's load is made by the processing module 220. As described above, this determination may involve receiving link load information from the target base station. If the processing module 220 determines the target link to be in a high-load state (515—High), the processing proceeds to step 590, where the handover is terminated, after which the process ends in step 595.

Alternatively, if the processor module 220 determines that the target link is in a non-high-load state (515—Non-High), then the process proceeds to step 520. In step 520, the processor module 220 notifies the cost module 240 of the handover, and provides with the notification, various properties of the target communication link. In step 530, the cost module 240 calculates a cost associated with the target communication link. As previously discussed, this calculation may involve determining expected power consumption and/or data service costs based on a user's data plan.

Once the cost module 240 determines the cost associated with the handover, the cost module 240 requests user authorization of the handover. This request may involve providing the calculated cost to the user on a user display and receiving a user input in response thereto.

In step 545, a determination is made as to whether the user has authorized or declined the handover. If the user declines the handover (545—No), the process proceeds to step 590, wherein the handover is terminated, after which the process ends in step 595. If, on the other hand, the user authorizes the handover (545—Yes), the process proceeds to step 550.

In step 550, the handover module 230 notifies the application module 250 of the handover. In an embodiment, the notification may include one or more properties associated with the target communication link. In step 560, the application module 250 selects an operating state of one or more applications based on the target communication link properties. In step 570, the application module configures the application in accordance with the selected operating state.

After the application module has configured the one or more applications (step 570), the wireless communication device 200 completes the handover in step 580, after which the process ends in step 595.

It should be understood that the above description of the exemplary method 500 may include or lack one or more optional processes. It should also be understood that the exemplary method may include any of the functionality described herein with respect to the exemplary wireless communication device 200.

Exemplary Method for Acquiring Link with Application Connection Preferences

Figure 6:
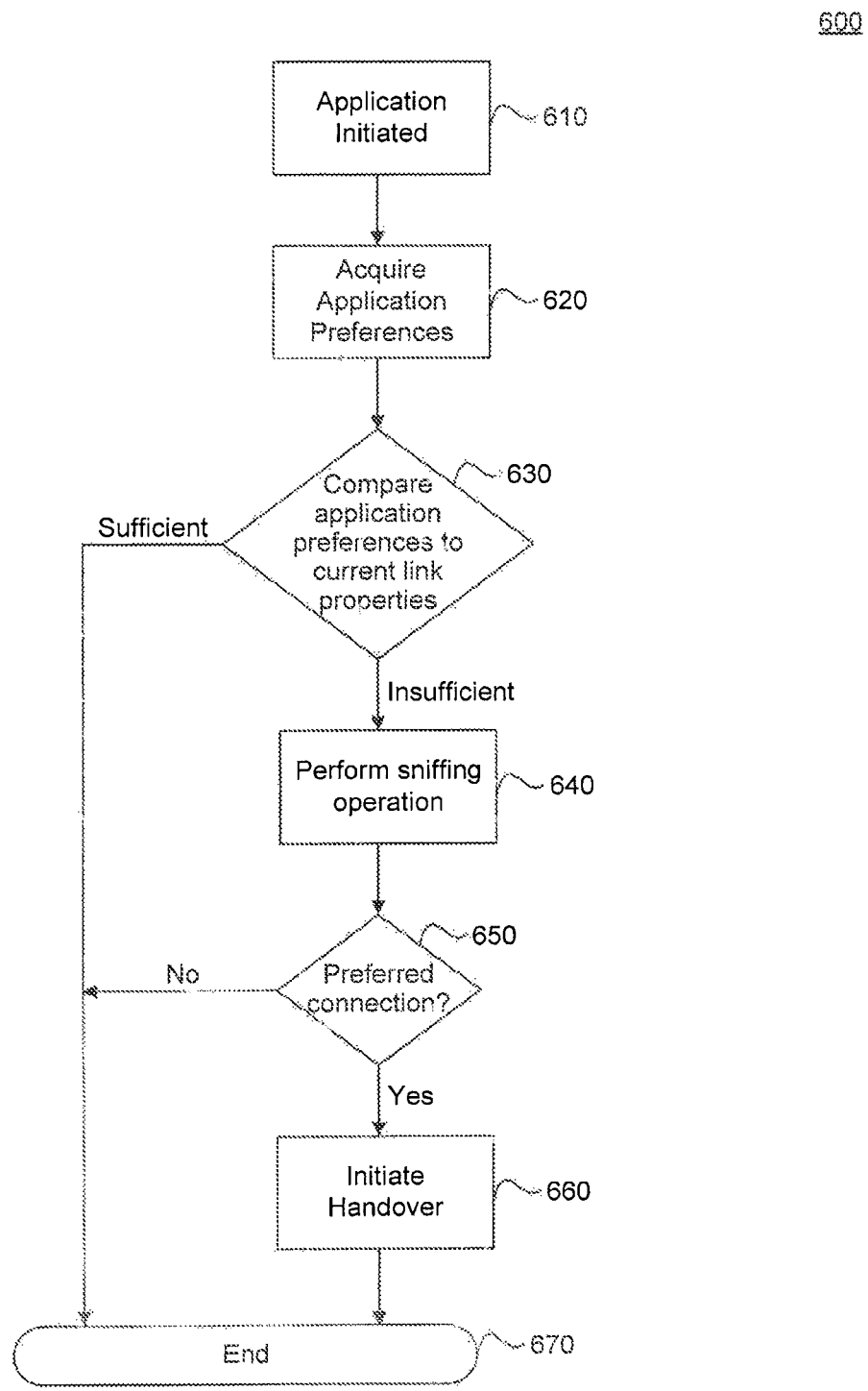
FIG. 6 illustrates a flowchart diagram of an exemplary method for acquiring a communication link that satisfies application connection preferences.

FIG. 6 illustrates a flowchart diagram of an exemplary method 600 for acquiring a communication link that satisfies application connection preferences. For purposes of illustration, the method of FIG. 6 will be discussed with continued reference to FIG. 2. As would be appreciated by a person of ordinary skill in the art, the method of FIG. 6 is not limited to the embodiment of FIG. 2.

In step 610, an application is initiated from the application module 250. In step 620, after the application has been initiated, the processor module 220 acquires the application's connection preferences from a connection preference module 260. In an embodiment, the application's connection preferences can be retrieved from memory after having previously been stored.

In step 630, the processor module 220 performs a comparison of the acquired connection preferences to current communication link properties in order to determine whether the current communication link satisfies the application's link preferences. If the processor module 220 determines that current communication link is sufficient (630—Sufficient), then the process proceeds to step 670, where the process ends.

If, on the other hand, the processor module 220 determines that the current communication link is insufficient (630—Insufficient), then the process proceeds to step 640. In step 640, the processor module 220 controls the transceiver module 210 to perform a sniffing operation of nearby base stations. In an embodiment, the sniffing operation returns nearby available base stations and their connection properties.

In step 650, the processor module 220 determines, based on the returned connection properties of the nearby base stations, whether there is a preferred connection available. Such a preferred connection may be a connection that fully satisfies the application's connection preferences, or that partially satisfies the application's connection preferences but to a greater extent than the current communication link.

If the processor module 220 determines that no preferred connection is available (650—N), then the process proceeds to step 670 where the process ends. If, on the other hand, the processor module 220 determines that a preferred connection is available (650—Y), then the process proceeds to step 660 where a handover to the preferred connection is initiated. After initiating the handover, the process ends in step 670.

It should be understood that the above description of the exemplary method 600 may include or lack one or more optional processes. It should also be understood that the exemplary method may include any of the functionality described herein with respect to the exemplary wireless communication device 200.

Conclusion

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Further, the invention should not be limited by any of the above-described exemplary embodiments, but should be defined only in accordance with the following claims and their equivalents.

What is claimed is:

1. A method of handing over by a wireless communication device from a current communication link to a target communication link within a wireless communication environment, the method comprising:
running an application that communicates on the wireless communication environment;
receiving load information and a link property of the target communication link;
determining from the load information whether the target communication link is in a high-load state by comparing the received load information of the target communication link to previously-stored load information of the target communication link;
calculating a power consumption associated with communicating over the target communication link based on the link property by calculating an application power consumption of the application communicating over the target communication link; and
requesting authorization to handover to the target communication link based on the power consumption and the determination of whether the target communication link is in the high-load state.

2. The method of claim 1, wherein if the determining determines that the target communication link is in the high-load state, prohibiting the handover to the target communication link.

3. The method of claim 1, wherein the calculating includes determining a power consumption cost of the application communicating on the target communication link.

4. The method of claim 3, further comprising calculating a data rate cost based on a data cost of a data service plan provided by a wireless service provider with respect to the wireless communication device.

5. The method of claim 3, wherein the requesting includes:
   providing the calculated power consumption cost to an interface of the wireless communication device; and
   receiving an input indicating whether the power consumption cost is accepted or rejected.

6. The method of claim 5, wherein if the input indicates a rejection of the power consumption cost, prohibiting the handover to the target communication link.

7. The method of claim 5, wherein the calculated power consumption cost is provided on a display screen.

8. A wireless communication device, comprising:
   a receiver that receives load information and a link property of a target communication link; and
   one or more processors and/or circuits configured to:
      determine whether the target communication link is in a high-load state by comparing the received load information to a previously-stored link load of the target communication link;
      run an application that communicates on a wireless communication environment;
      calculate a power consumption associated with communicating over the target communication link based on the link property by calculating an application power consumption of the application communicating over the target communication link; and
      request authorization to handover to the target communication link based on the power consumption and the determination of whether the target communication link is in the high-load state.

9. The wireless communication device of claim 8, wherein the calculation includes calculating a power consumption cost of communicating on the target communication link.

10. The wireless communication device of claim 9, wherein the power consumption cost is indicative of an amount of power that the wireless communication device will expend while connected to the target communication link.

11. The wireless communication device of claim 10, wherein the one or more processors and/or circuits are further configured to determine a data rate cost based on a data cost of a data service plan provided by a wireless service provider with respect to the wireless communication device.

12. The wireless communication device of claim 8, further comprising a display,
   wherein the request for authorization includes:
      displaying the power consumption cost on the display; and
      receiving an input accepting or rejecting the power consumption cost.

13. The wireless communication device of claim 12, wherein the one or more processors and/or circuits are further configured to:
   handover to the target communication link in response to receiving the input accepting the power consumption cost; and
   terminate a handover procedure to the target communication link in response to receiving the input rejecting the power consumption on cost.

14. A method for determining whether, in a wireless communication device, to handover from a current communication link to a target communication link, the method comprising:
   running an application that communicates over at least one of the current communication link or the target communication link;
   measuring communication properties of the target communication link;
   determining, from the measured communication properties, a plurality of communication parameters;
   calculating a power consumption associated with communicating over the target communication link based on the plurality of communication parameters by calculating an application power consumption of the application communicating over the target communication link; and
   determining whether to complete the handover to the target communication link based on the power consumption,
   wherein the plurality of communication parameters include a link property and load information, and
   wherein the determining of the plurality of communication parameters includes determining whether the target communication link is in a high-load state or a low-load state by comparing a current load of the target communication link to a previously-stored link load.

15. The method of claim 14, wherein the load information is indicative of whether the target communication link is in the high-load state or the low-load state.

16. The method of claim 14, wherein the determining of whether to complete the handover includes:
   displaying a cost associated with performing the handover; and
   receiving an input accepting or rejecting the cost.

17. The method of claim 14, wherein the determining of the power consumption includes adjusting operating parameters of applications running on the wireless communication device.

18. The method of claim 17, wherein the operating parameters are stored in a table in association with cost values.

* * * * *